United States Patent
Sodeyama et al.

(10) Patent No.: US 12,514,561 B2
(45) Date of Patent: Jan. 6, 2026

(54) ULTRASOUND DIAGNOSTIC APPARATUS

(71) Applicant: FUJIFILM Healthcare Corporation, Chiba (JP)

(72) Inventors: Aya Sodeyama, Tokyo (JP); Chizue Tanaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 14 days.

(21) Appl. No.: 18/534,722

(22) Filed: Dec. 11, 2023

(65) Prior Publication Data

US 2024/0188935 A1 Jun. 13, 2024

(30) Foreign Application Priority Data

Dec. 13, 2022 (JP) ................. 2022-198830

(51) Int. Cl.
*A61B 8/08* (2006.01)
*A61B 8/00* (2006.01)

(52) U.S. Cl.
CPC ............ *A61B 8/5207* (2013.01); *A61B 8/465* (2013.01); *A61B 8/5269* (2013.01)

(58) Field of Classification Search
CPC ..... A61B 8/5207; A61B 8/465; A61B 8/5269; A61B 8/14; A61B 8/54; A61B 8/5215
See application file for complete search history.

(56) References Cited

U.S. PATENT DOCUMENTS

| | | |
|---|---|---|
| 2017/0150948 A1 | 6/2017 | Kanayama |
| 2017/0258438 A1* | 9/2017 | Kanayama ........... A61B 8/5207 |
| 2020/0268355 A1 | 8/2020 | Watanabe et al. |

FOREIGN PATENT DOCUMENTS

| | | |
|---|---|---|
| JP | 2005152422 | 6/2005 |
| JP | 2017093913 | 6/2017 |
| JP | 2017158917 | 9/2017 |
| JP | 2020138017 | 9/2020 |

* cited by examiner

*Primary Examiner* — Kaitlyn E Sebastian
(74) *Attorney, Agent, or Firm* — JCIPRNET

(57) ABSTRACT

An evaluation range decision unit analyzes reception beam data before detection processing out of reception beam data to decide an evaluation range excluding at least a part of a structure of a subject in a data space of the reception beam data. An attenuation amount estimation unit estimates an attenuation amount of ultrasound waves in the subject based on a frequency spectrum of the reception beam data of each region included in the evaluation range among a plurality of regions arranged in a depth direction defined in advance in the data space of the reception beam data. An image formation unit executes TGC processing as brightness correction processing based on the attenuation amount of the ultrasound waves estimated by the attenuation amount estimation unit.

7 Claims, 13 Drawing Sheets

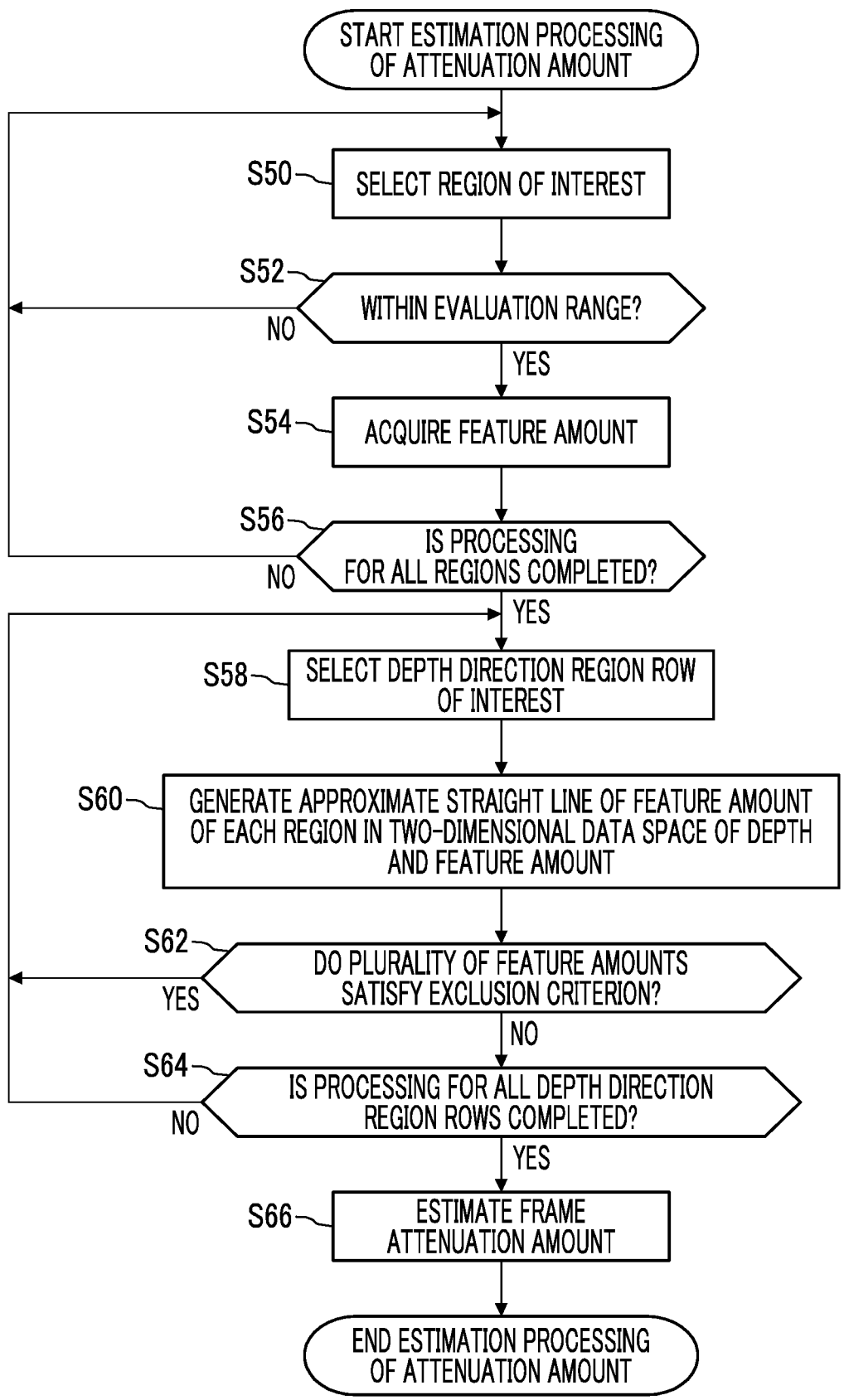

ULTRASOUND DIAGNOSTIC APPARATUS

CROSS-REFERENCE TO RELATED APPLICATION

This application claims the priority benefit of Japan application serial no. 2022-198830, filed on Dec. 13, 2022. The entirety of the above-mentioned patent application is hereby incorporated by reference herein and made a part of this specification.

BACKGROUND

1. Technical Field

The present disclosure relates to an improvement of an ultrasound diagnostic apparatus.

2. Description of the Related Art

In the related art, an ultrasound diagnostic apparatus has been known, which transmits and receives ultrasound waves to and from a subject, forms an ultrasound image based on a reception signal obtained by transmitting and receiving the ultrasound waves, and displays the formed ultrasound image on a display. The ultrasound image that can be formed by the ultrasound diagnostic apparatus includes a tomographic image (B-mode image) that is formed by transforming the signal intensity (amplitude) of the reception signal into a brightness value.

The ultrasound waves transmitted to the subject are attenuated in the subject. Therefore, the signal intensity of the reflected waves reflected from a deep part of the subject (place farther from a body surface) is smaller than the signal intensity of the reflected waves reflected from a shallow part. Then, in the B-mode image, the brightness of the pixel in the deep part is smaller than the brightness of the pixel in the shallow part.

In order to correct this phenomenon, in the related art, time gain control (TGC) of correcting the signal intensity of the reflected waves according to the depth of the subject is performed.

For example, JP2005-152422A discloses an ultrasound image formation apparatus that can calculate a histogram for each brightness value of each pixel of an ultrasound image, obtain a cumulative histogram obtained by cumulating the histograms of the respective brightness values, and automatically perform TGC with a gain correction value obtained such that the cumulative histogram is a curve that passes through predetermined frequency value and brightness value.

JP2017-158917A, JP2017-093913A, and JP2020-138017A also disclose an ultrasound diagnostic apparatus having a TGC function. It should be noted that, JP2017-158917A, JP2017-093913A, and JP2020-138017A describe that a position of a structure (for example, organ) of a subject in the ultrasound image is estimated based on an average value and a variance value of the pixel values (brightness values) for each of a plurality of regions set in an ultrasound image (B-mode image).

SUMMARY OF THE INVENTION

Noise called a speckle is generated in the B-mode image that is the ultrasound image in some cases. The speckle is an image of a stripe pattern generated by interference of scattered waves generated at an unspecified larger number of places in the subject with each other. Therefore, in a case in which the TGC is automatically performed by analyzing the brightness of each pixel of the B-mode image (in a case in which the gain correction value of the TGC is automatically decided), there is a case in which an appropriate TGC cannot be executed due to the influence of the speckle.

In addition, in a region corresponding to the structure (for example, organ or blood vessel) in the subject in the B-mode image, the brightness value may be high (or low conversely) due to a constitution of the structure. In addition, in the structure in the subject, there is a case in which the attenuation of the ultrasound waves is not so much generated as compared with other positions. Therefore, it is desirable to reduce the influence of the structure of the subject in the automatic TGC.

An object of an ultrasound diagnostic apparatus of the present disclosure is to execute suitable automatic time gain control in which influences of a structure and a speckle in a subject are reduced.

An aspect of the present disclosure relates to an ultrasound diagnostic apparatus comprising: an evaluation range decision unit that analyzes reception beam data before detection processing out of reception beam data formed by reception beam forming with respect to a reception signal obtained by transmitting and receiving ultrasound waves to and from a subject, to decide an evaluation range excluding at least a part of a structure of the subject in a data space of the reception beam data; an attenuation amount estimation unit that estimates an attenuation amount of the ultrasound waves based on a frequency spectrum of the reception beam data before the detection processing of each region included in the evaluation range among a plurality of regions arranged in a depth direction of the subject defined in advance in the data space of the reception beam data, without using the reception beam data of the region that is not included in the evaluation range; and an image formation unit that forms an ultrasound image based on the reception beam data subjected to the detection processing while executing brightness correction processing of correcting, to compensate for brightness of a pixel of the ultrasound image which is decreased due to attenuation of the ultrasound waves, the brightness of each pixel based on the estimated attenuation amount.

With this configuration, the evaluation range decision unit excludes the region including the structure in the subject from the evaluation range that is a target for estimating the attenuation amount of the ultrasound waves. As a result, the influence of the structure in the subject in the brightness correction processing is reduced. Further, with this configuration, the attenuation amount estimation unit calculates the frequency spectrum of the reception beam data for each region having a certain width, and estimates the attenuation amount of the ultrasound image based on the frequency spectra of the plurality of regions arranged in the depth direction. As a result, the influence of the speckle in the brightness correction processing is reduced.

The evaluation range decision unit may decide the evaluation range based on a change tendency of the frequency spectrum of the reception beam data before the detection processing between the respective regions arranged in the depth direction.

The evaluation range decision unit may decide the evaluation range based on at least one of a change tendency of a frequency integrated value of signal intensity in the frequency spectrum, a change tendency of a signal intensity slope representing a degree of decrease of the signal intensity toward a high frequency side in the frequency spectrum, a change tendency of a cross point frequency that is a frequency at which signal intensity of a signal component and signal intensity of a noise component in the frequency spectrum are the same as each other, or a change tendency of a representative frequency of the frequency spectrum between the respective regions arranged in the depth direction.

The attenuation amount estimation unit may estimate the attenuation amount based on at least one of a frequency integrated value of signal intensity in the frequency spectrum, a signal intensity slope representing a degree of decrease of the signal intensity toward a high frequency side in the frequency spectrum, a cross point frequency that is a frequency at which signal intensity of a signal component and signal intensity of a noise component in the frequency spectrum are the same as each other, or a representative frequency of the signal component in the frequency spectrum of the respective regions arranged in the depth direction.

The attenuation amount estimation unit may estimate the attenuation amount for each region row arranged in the depth direction, to estimate a frame attenuation amount corresponding to one frame based on a plurality of the attenuation amounts estimated for a plurality of the region rows for one frame.

With this configuration, in a case in which the attenuation amounts of the ultrasound waves calculated for each region row arranged in the depth direction are different from each other, in the ultrasound image after the brightness correction processing, it is possible to suppress the brightness correction value from being different for each region row arranged in the depth direction.

The image formation unit may execute the brightness correction processing at a timing at which an instruction is given from a user.

With this configuration, the user can execute the brightness correction processing at any timing, and can suppress flicker (temporal change in the brightness value) of the B-mode image.

The image formation unit may execute the brightness correction processing in a case in which it is determined that a posture of an ultrasound probe that transmits and receives the ultrasound waves to and from the subject is stable.

With this configuration, it is possible to automatically execute the brightness correction processing in a case in which the user brings the ultrasound probe into contact with a target position of the subject and maintains the contact.

With the ultrasound diagnostic apparatus disclosed in the present disclosure, it is possible to execute suitable automatic time gain control in which the influences of the structure and the speckle in the subject are reduced.

BRIEF DESCRIPTION OF THE DRAWINGS

FIG. 13 is a flowchart showing a flow of estimation processing of an attenuation amount.

DESCRIPTION OF THE EMBODIMENTS

Schematic Configuration of Ultrasound Diagnostic Apparatus

Figure 1:
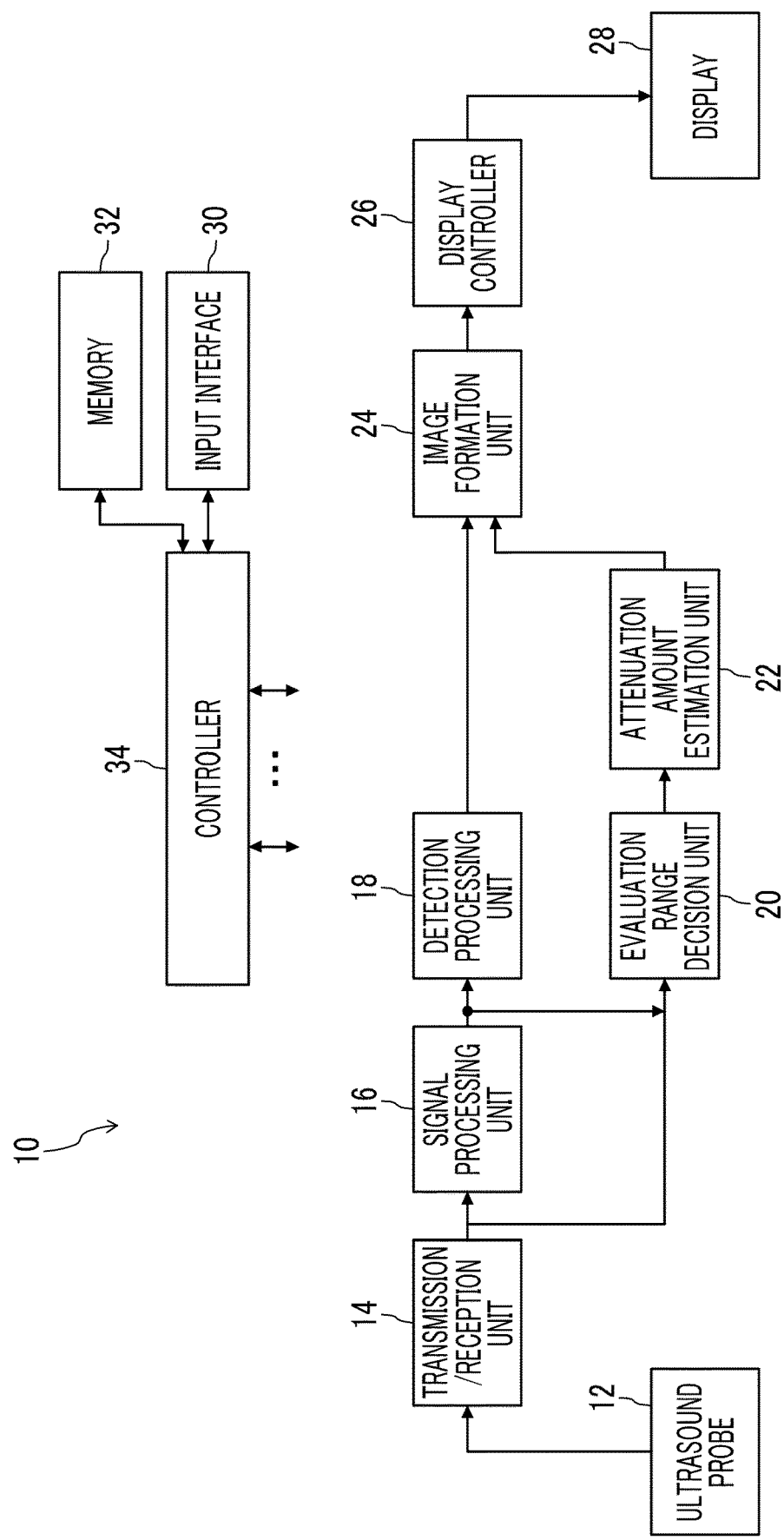
FIG. 1 is a schematic configuration diagram of an ultrasound diagnostic apparatus according to the present embodiment.

FIG. 1 is a schematic configuration diagram of an ultrasound diagnostic apparatus 10 according to the present embodiment. The ultrasound diagnostic apparatus 10 is a medical apparatus that is installed in a medical institution, such as a hospital, and is used during an ultrasound examination.

The ultrasound diagnostic apparatus 10 is an apparatus that scans a subject with an ultrasound beam to generate an ultrasound image based on a reception signal obtained by the scanning. For example, the ultrasound diagnostic apparatus 10 forms a tomographic image (B-mode image) in which the amplitude intensity of reflected waves from a scanning surface is transformed into the brightness based on the reception signal. Alternatively, the ultrasound diagnostic apparatus 10 can also form a Doppler image, which is an ultrasound image showing a motion velocity of a tissue in the subject, based on a difference (Doppler shift) between frequencies of transmitted waves and received waves. In the present embodiment, processing of generating the B-mode image by the ultrasound diagnostic apparatus 10 will be described.

An ultrasound probe 12 is a device that transmits and receives ultrasound waves to and from the subject. The ultrasound probe 12 has an oscillation element array including a plurality of oscillation elements that transmit and receive the ultrasound waves to and from the subject. An acceleration sensor may be provided in the ultrasound probe 12. A detection signal of the acceleration sensor is transmitted to an apparatus main body, whereby the apparatus main body can detect a posture of the ultrasound probe 12.

A transmission/reception unit 14 transmits a transmission signal to the ultrasound probe 12 (specifically, each oscillation element of the oscillation element array) under the control of a controller 34 (described later). As a result, the ultrasound waves are transmitted from each oscillation element toward the subject. In addition, the transmission/reception unit 14 receives a reception signal from each oscillation element that receives the reflected waves from the subject. The transmission/reception unit 14 includes an adder and a plurality of delayers corresponding to the respective oscillation elements, and phase adjustment addition processing of aligning and adding phases of the reception signals from the respective oscillation elements is performed by the adder and the plurality of delayers. As a result, reception beam data in which information indicating the signal intensity of the reflected waves from the subject is arranged in a depth direction of the subject is formed. Processing of forming the reception beam data is referred to as reception beam forming.

The signal processing unit 16 executes various types of signal processing including, for example, filter processing of applying a bandpass filter to the reception beam data from the transmission/reception unit 14.

The reception signal (reception beam data) after the reception beam forming by the transmission/reception unit 14 or the reception signal after the filter processing by the signal processing unit 16 is transmitted to an evaluation range decision unit 20 described later.

A detection processing unit 18 executes processing, such as detection processing (for example, envelope detection processing) or logarithmic compression processing, with respect to the reception signal after the processing by the signal processing unit 16. The reception signal loses the phase information (frequency information) due to the detection processing by the detection processing unit 18. That is, an amount of information of the reception signal after the detection processing is smaller than an amount of information of the reception signal before the detection processing.

The evaluation range decision unit 20 analyzes the reception beam data before the detection processing out of the reception beam data formed by the reception beam forming with respect to the reception signal obtained by transmitting and receiving the ultrasound waves to and from the subject. The reception beam data before the detection processing includes reception beam data immediately after the reception beam forming by the transmission/reception unit 14 and reception beam data after various types of signal processing including the filter processing by the signal processing unit 16. As a result, the evaluation range decision unit 20 decides an evaluation range excluding at least a part of a structure in the subject in the data space of the reception beam data corresponding to the region of the ultrasound image to be formed later. The structure in the subject in the present disclosure adversely affects (decreases the accuracy of an estimated attenuation amount) in estimating an attenuation amount of the ultrasound waves in the subject. That is, in the structure, the method of attenuating the ultrasound waves transmitted to the structure is different from a normal method (method of attenuating in a part other than the structure). Examples of the structure include an organ or a blood vessel. Details of the processing of the evaluation range decision unit 20 will be described later.

An attenuation amount estimation unit 22 estimates the attenuation amount of the ultrasound waves in the subject by using the reception beam data included in the evaluation range without using the reception beam data that is not included in the evaluation range decided by the evaluation range decision unit 20 out of the reception beam data. Details of the processing of the attenuation amount estimation unit 22 will be described later.

An image formation unit 24 forms the ultrasound image (B-mode image) based on the reception beam data subjected to the detection processing or the like by the detection processing unit 18. In particular, the image formation unit 24 executes TGC processing as brightness correction processing based on the attenuation amount of the ultrasound waves, which is estimated by the attenuation amount estimation unit 22. As described above, the TGC processing is processing of correcting, to compensate for the brightness of the pixel of the ultrasound image which is decreased due to the attenuation of the ultrasound waves, the brightness of each pixel. The image quality enhancement processing of the ultrasound image by the image formation unit 24 will be described later.

A display controller 26 performs control of displaying, on a display 28, the ultrasound image formed by the image formation unit 24 and various types of other information. The display 28 is, for example, a display device configured of a liquid crystal display, an organic electro luminescence (EL), or the like.

An input interface 30 is configured of, for example, a button, a track ball, a touch panel, or the like. The input interface 30 is used to input a command from a user to the ultrasound diagnostic apparatus 10.

A memory 32 includes a hard disk drive (HDD), a solid-state drive (SSD), an embedded Multimedia card (eMMC), a read only memory (ROM), or the like. The memory 32 stores an ultrasound diagnostic program for operating each of the units of the ultrasound diagnostic apparatus 10. It should be noted that the ultrasound diagnostic program can also be stored, for example, in a computer-readable non-transitory storage medium, such as a universal serial bus (USB) memory or a CD-ROM. The ultrasound diagnostic apparatus 10 can read and execute the ultrasound diagnostic program from such a storage medium.

The controller 34 includes at least one of a general-purpose processor (for example, a central processing unit (CPU)) or a dedicated processor (for example, a graphics processing unit (GPU), an application specific integrated circuit (ASIC), a field-programmable gate array (FPGA), a programmable logic device, and the like). The controller 34 may be configured by the cooperation of a plurality of processing devices that are present at physically separated positions, instead of being configured of one processing device. The controller 34 controls each of the units of the ultrasound diagnostic apparatus 10 according to the ultrasound diagnostic program stored in the memory 32.

It should be noted that each of the units of the transmission/reception unit 14, the signal processing unit 16, the detection processing unit 18, the evaluation range decision unit 20, the attenuation amount estimation unit 22, the image formation unit 24, and the display controller 26 is configured of one or a plurality of processors, chips, electric circuits, or the like. Each of these units may be realized by the cooperation between hardware and software.

The schematic configuration of the ultrasound diagnostic apparatus 10 is described above. Hereinafter, the details of the TGC processing based on the decided attenuation amount by the evaluation range decision unit 20, the attenuation amount estimation unit 22, and the image formation unit 24 will be described.

Decision of Evaluation Range

Figure 2:
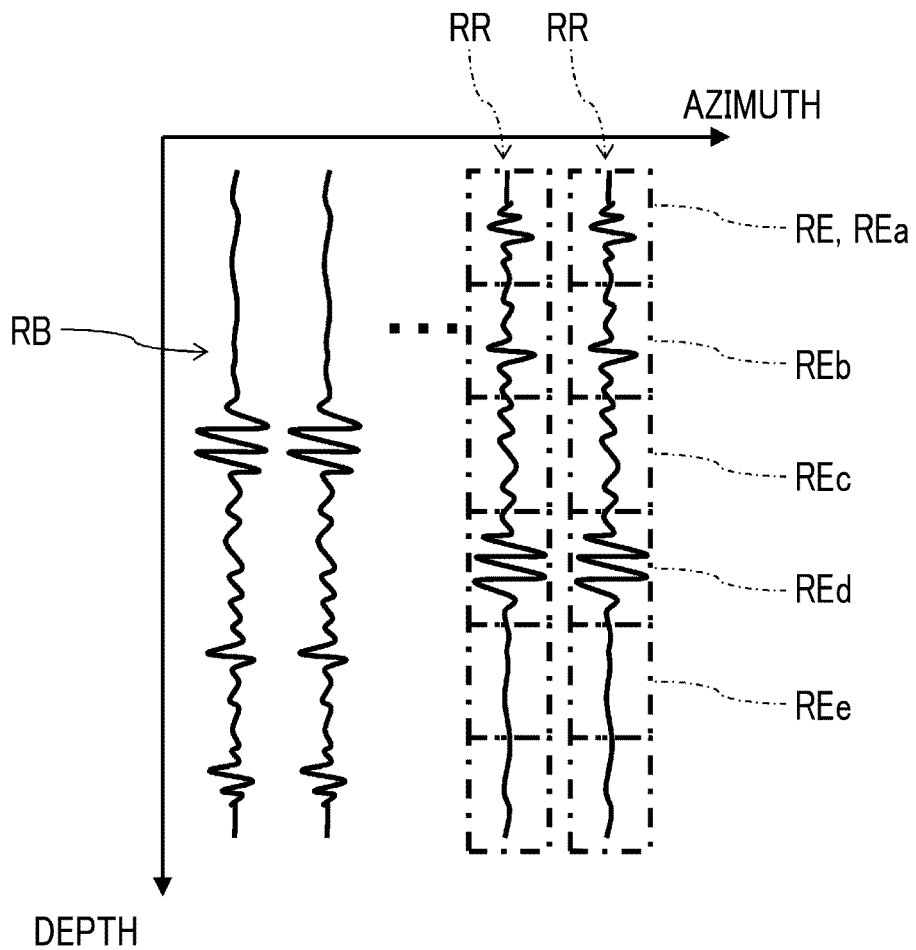
FIG. 2 is a conceptual diagram showing reception beam data and a region of the reception beam data in a data space.
Figure 3:
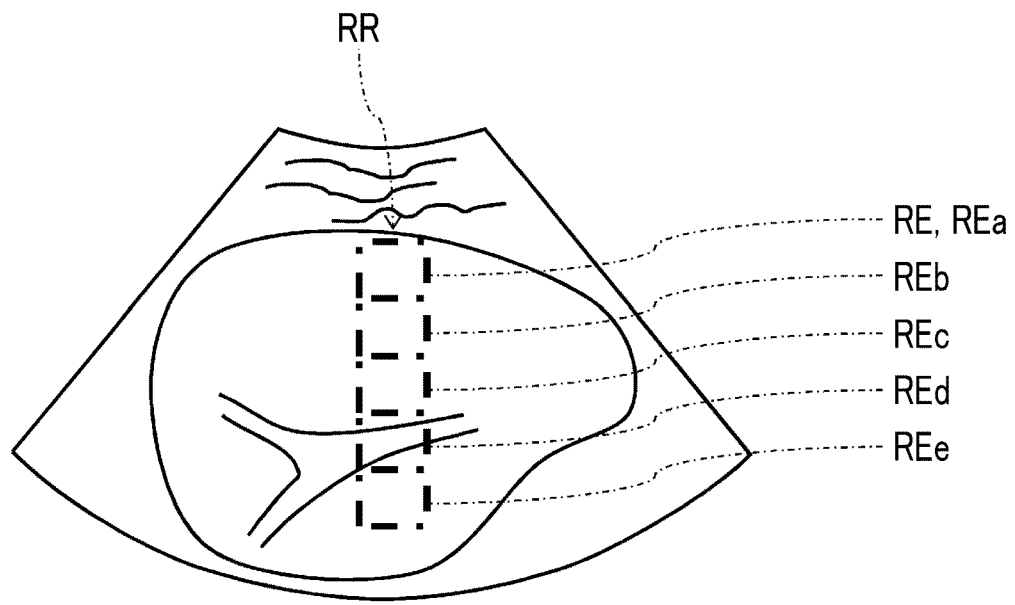
FIG. 3 is a conceptual diagram showing a region on an ultrasound image.
Figure 4A:
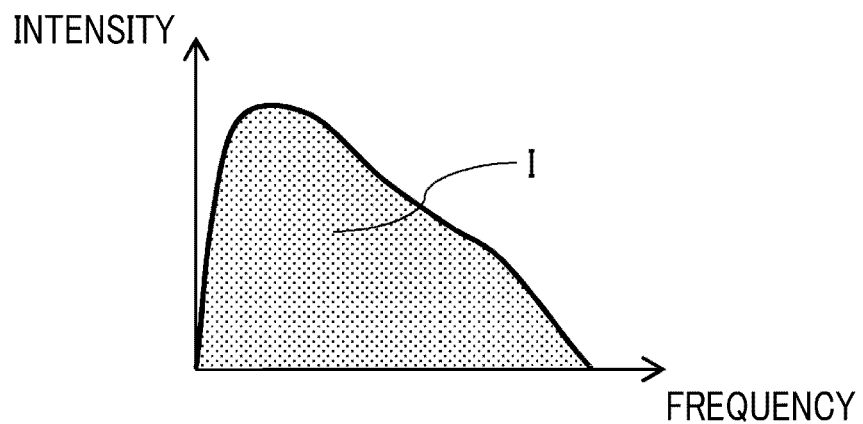
FIG. 4A is a diagram showing a frequency integrated value of a frequency spectrum in a region REa of FIG. 2.
Figure 4B:
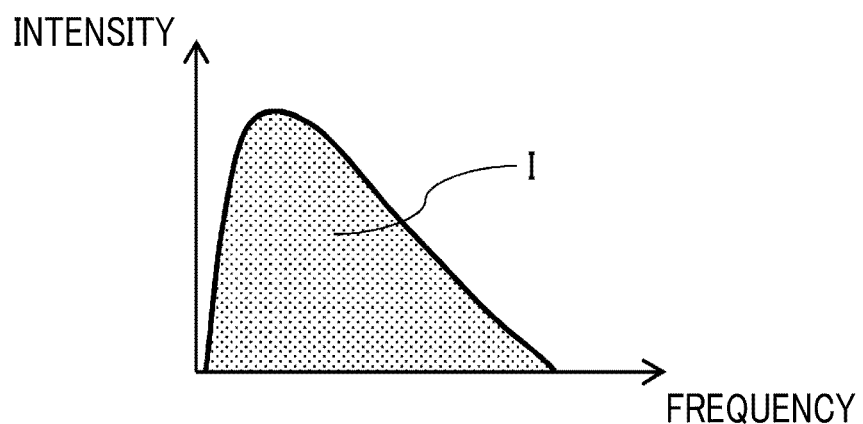
FIG. 4B is a diagram showing a frequency integrated value of a frequency spectrum in a region REb of FIG. 2.
Figure 4C:
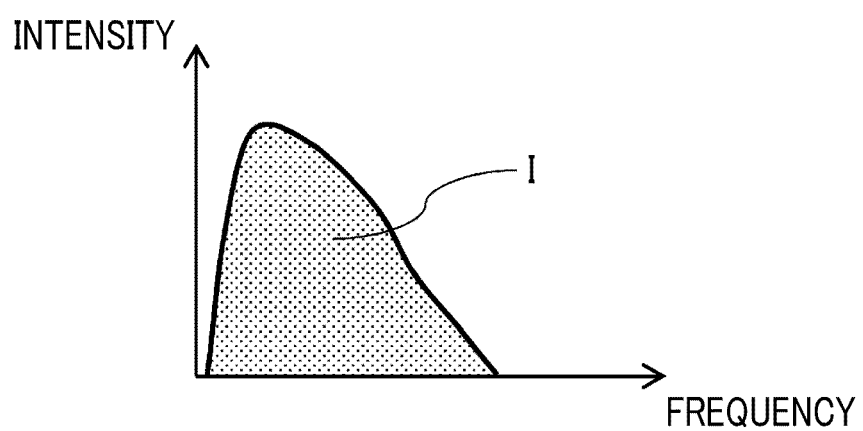
FIG. 4C is a diagram showing a frequency integrated value of a frequency spectrum in a region REc of FIG. 2.
Figure 4D:
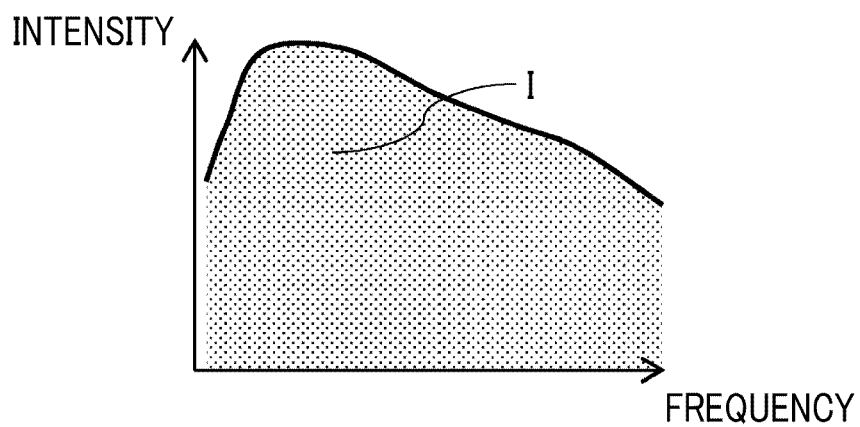
FIG. 4D is a diagram showing a frequency integrated value of a frequency spectrum in a region REd of FIG. 2.
Figure 4E:
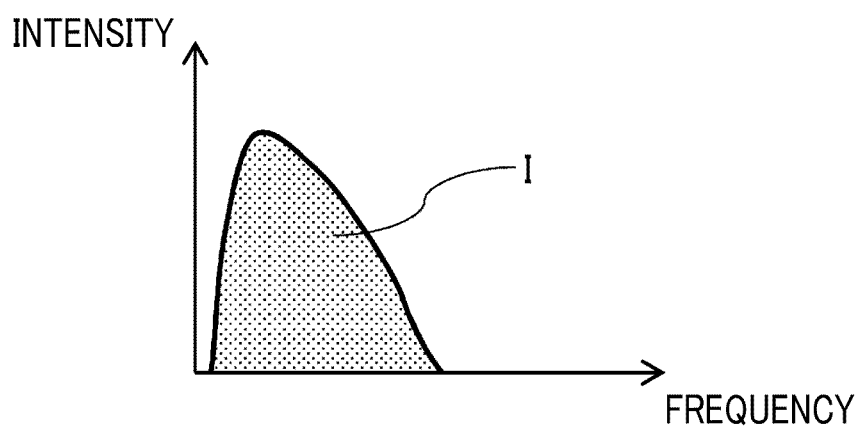
FIG. 4E is a diagram showing a frequency integrated value of a frequency spectrum in a region REe of FIG. 2.
Figure 5A:
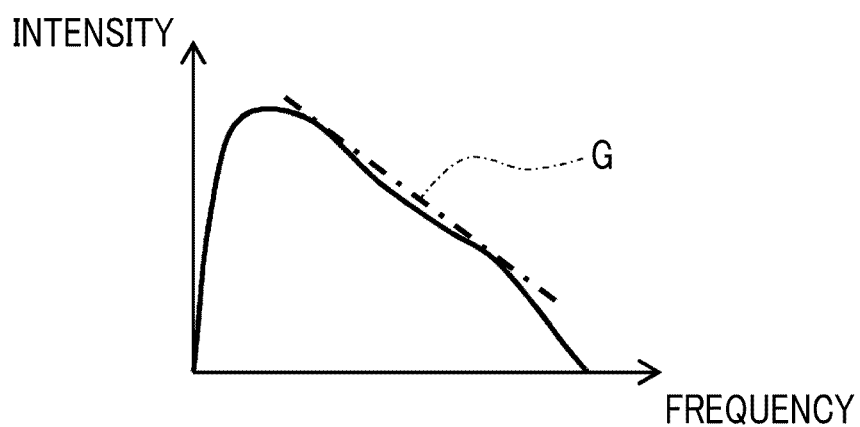
FIG. 5A is a diagram showing a signal intensity slope of the frequency spectrum in the region REa of FIG. 2.
Figure 5B:
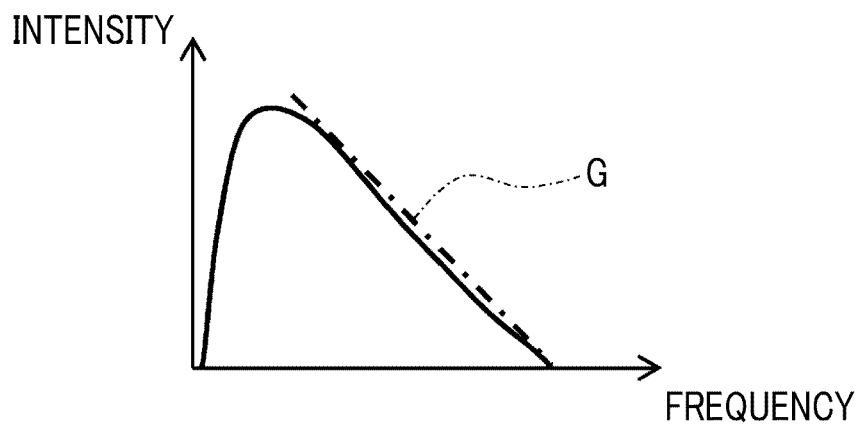
FIG. 5B is a diagram showing a signal intensity slope of the frequency spectrum in the region REb of FIG. 2.
Figure 5C:
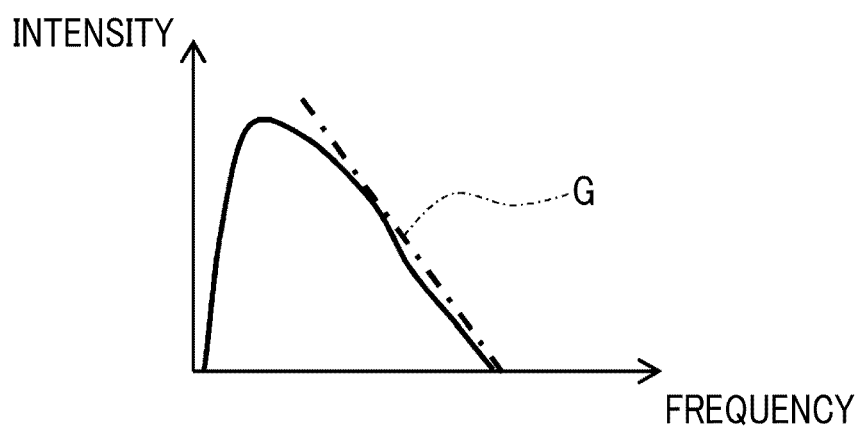
FIG. 5C is a diagram showing a signal intensity slope of the frequency spectrum in the region REc of FIG. 2.
Figure 5D:
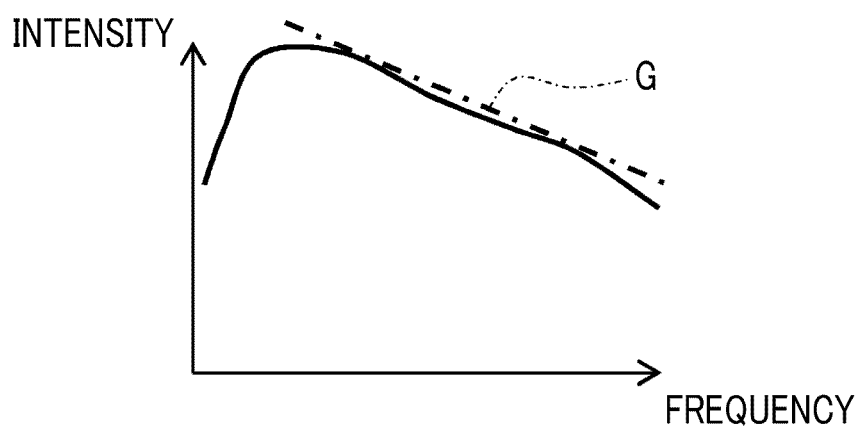
FIG. 5D is a diagram showing a signal intensity slope of the frequency spectrum in the region REd of FIG. 2.
Figure 5E:
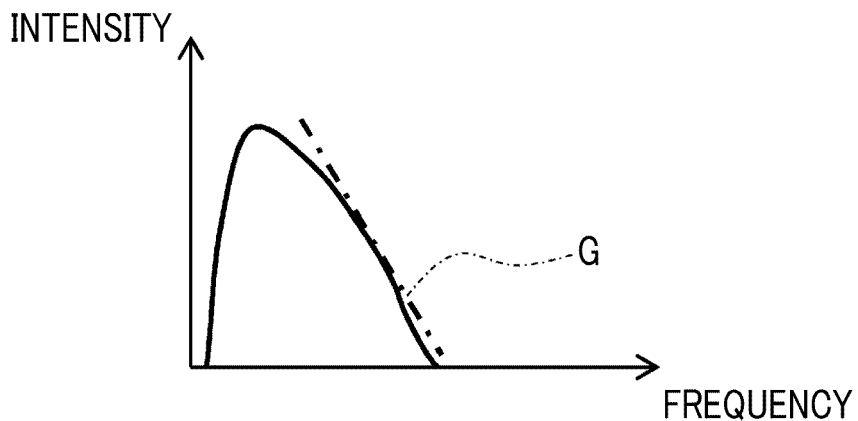
FIG. 5E is a diagram showing a signal intensity slope of the frequency spectrum in the region REe of FIG. 2.
Figure 6A:
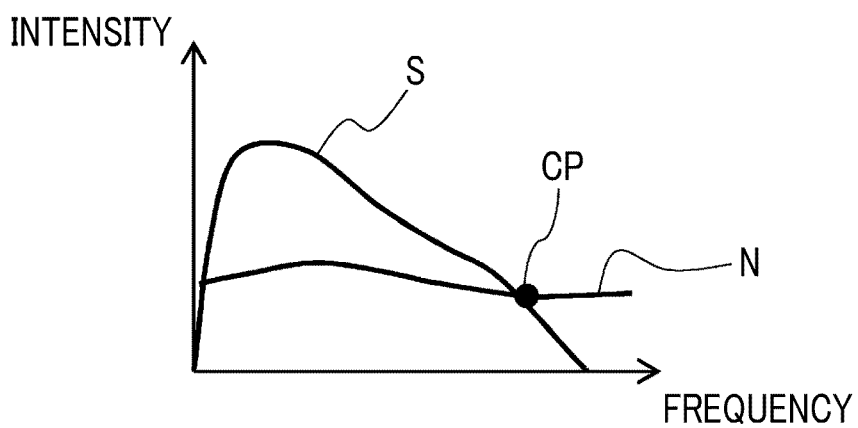
FIG. 6A is a diagram showing a signal component, a noise component, and a cross point of the frequency spectrum in the region REa of FIG. 2.
Figure 6B:
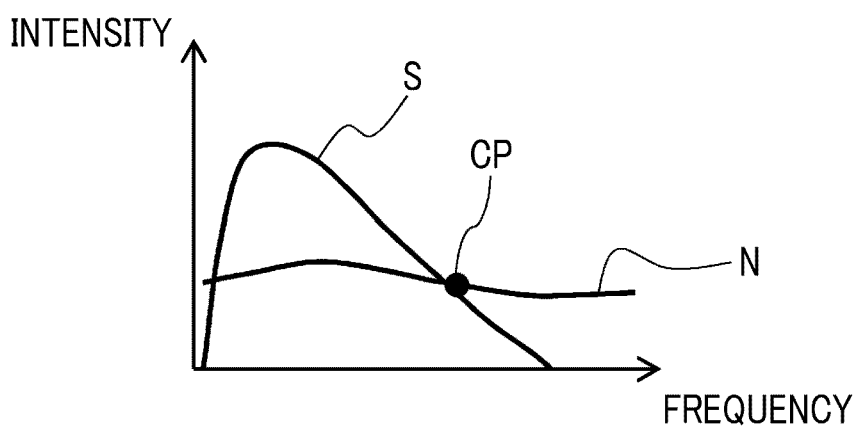
FIG. 6B is a diagram showing a signal component, a noise component, and a cross point of the frequency spectrum in the region REb of FIG. 2.
Figure 6C:
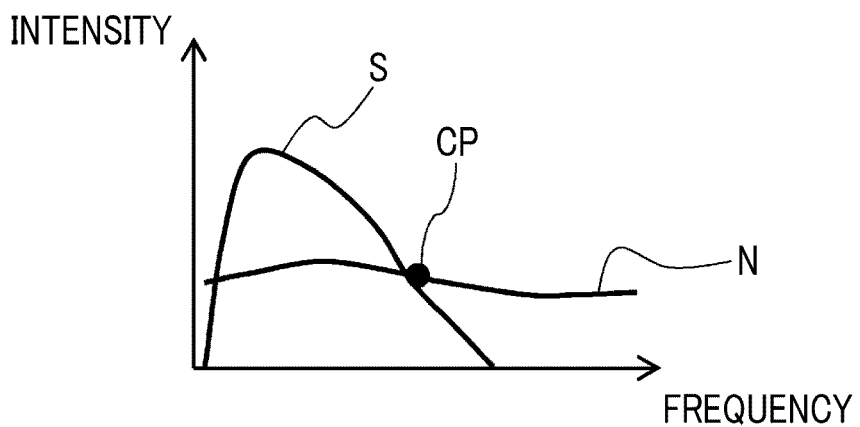
FIG. 6C is a diagram showing a signal component, a noise component, and a cross point of the frequency spectrum in the region REc of FIG. 2.
Figure 6D:
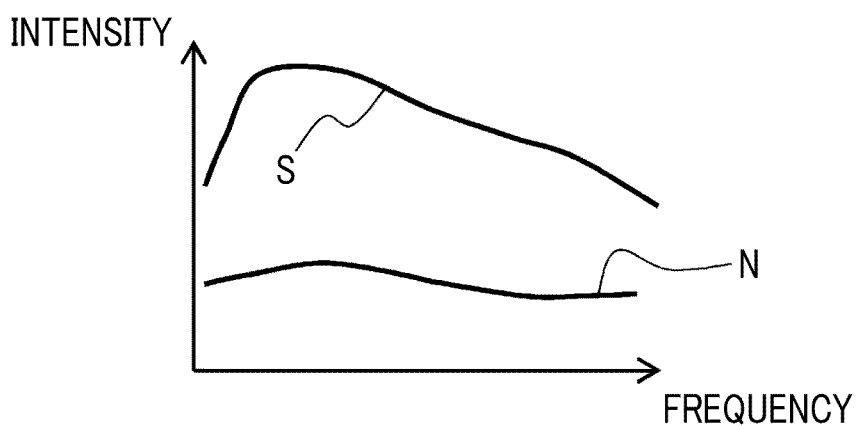
FIG. 6D is a diagram showing a signal component, a noise component, and a cross point of the frequency spectrum in the region REd of FIG. 2.
Figure 6E:
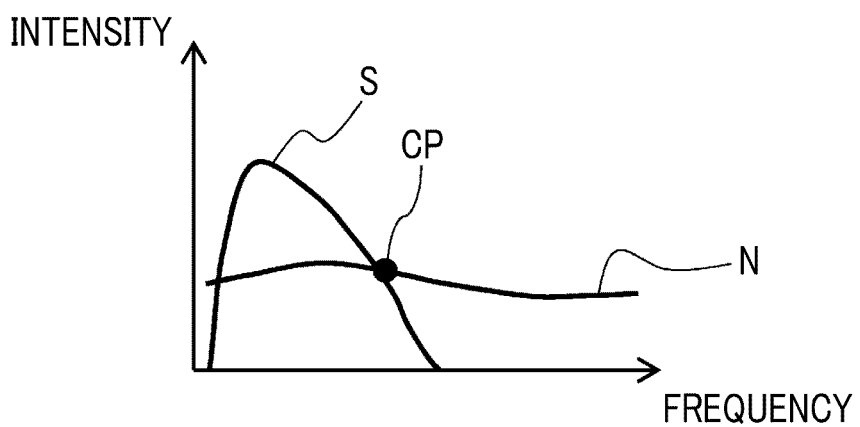
FIG. 6E is a diagram showing a signal component, a noise component, and a cross point of the frequency spectrum in the region REe of FIG. 2.
Figure 7A:
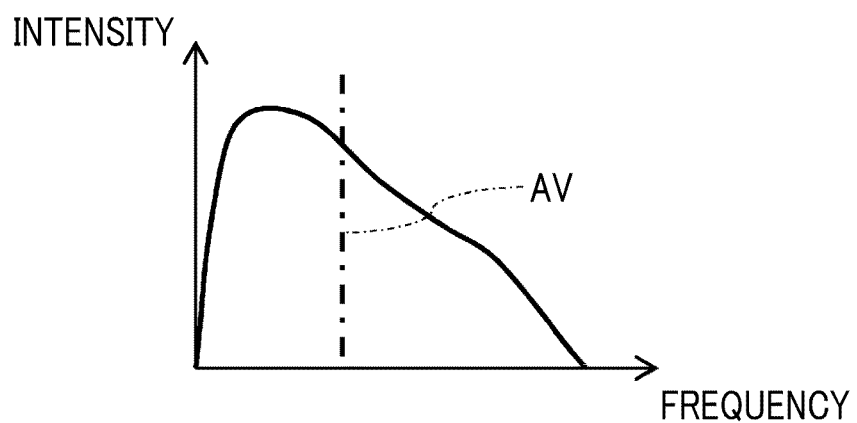
FIG. 7A is a diagram showing an average frequency of the frequency spectrum in the region REa of FIG. 2.
Figure 7B:
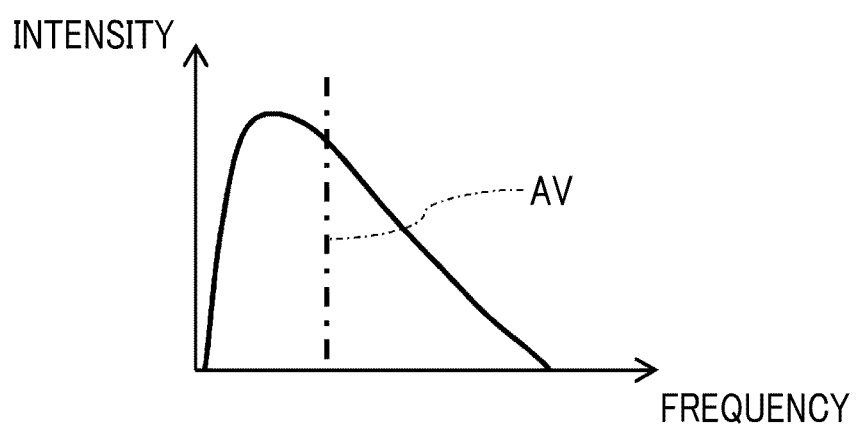
FIG. 7B is a diagram showing an average frequency of the frequency spectrum in the region REb of FIG. 2.
Figure 7C:
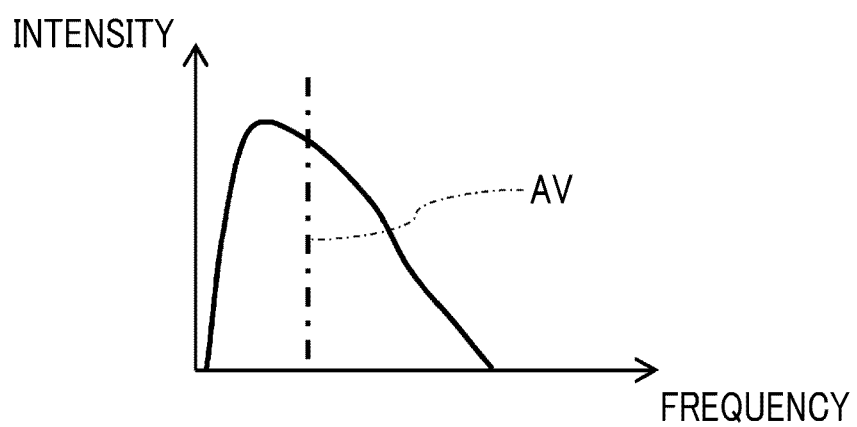
FIG. 7C is a diagram showing an average frequency of the frequency spectrum in the region REc of FIG. 2.
Figure 7D:
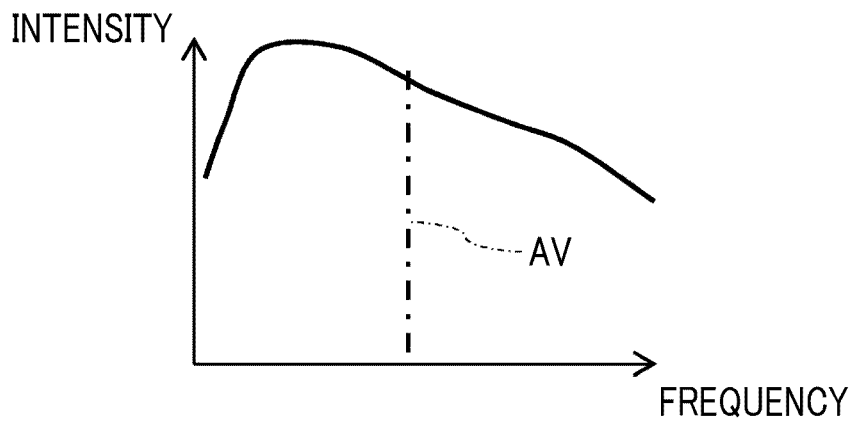
FIG. 7D is a diagram showing an average frequency of the frequency spectrum in the region REd of FIG. 2.
Figure 7E:
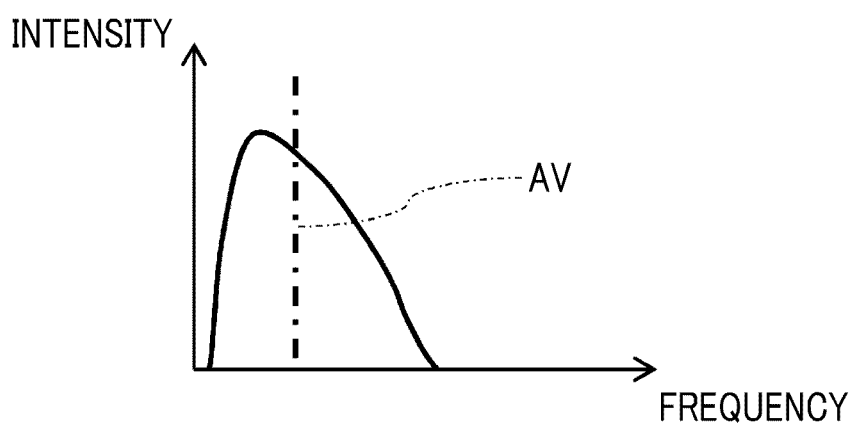
FIG. 7E is a diagram showing an average frequency of the frequency spectrum in the region REe of FIG. 2.

FIG. 2 is a conceptual diagram showing reception beam data RB formed by the reception beam forming by the transmission/reception unit 14 and a region RE defined in advance in the data space of the reception beam data RB. As shown in FIG. 2, a plurality of regions RE are defined in advance in the data space of the reception beam data RB. One region RE has a certain width (width corresponding to a plurality of pixels in the corresponding ultrasound image). In particular, in the data space of the reception beam data RB, a plurality of depth direction region rows RR formed of the plurality of regions RE arranged in the depth direction are defined (in FIG. 2, only a part of the plurality of depth direction region rows RR is shown). The plurality of depth direction region rows RR are arranged in an azimuth direction. Each region RE in the data space of the reception beam data RB corresponds to each region on the ultrasound image, as shown in FIG. 3. In the present disclosure, the region on the ultrasound image corresponding to the region RE in the data space of the reception beam data RB is also referred to as the region RE for the sake of convenience. Further, for the sake of convenience, the depth direction region row on the ultrasound image corresponding to the depth direction region row RR in the data space of the reception beam data RB is also referred to as the depth direction region row RR.

First, the evaluation range decision unit 20 executes frequency analysis processing (for example, fast Fourier transform (FFT)) with respect to the reception beam data RB before the detection processing in each region RE. As a result, a frequency spectrum of the reception beam data RB is acquired for each region RE. The evaluation range decision unit 20 decides the evaluation range in the depth direction region row RR based on a change tendency of a frequency spectrum of the reception beam data RB before the detection processing between the respective regions RE included in one depth direction region row RR (that is, between the respective regions RE arranged in the depth direction). Specifically, the evaluation range decision unit 20 classifies the plurality of regions RE included in the depth direction region row RR into the region RE included in the evaluation range and the region RE that is not included in the evaluation range.

By performing the processing described above with respect to the plurality of depth direction region rows RR, the evaluation range is decided in the entire data space (in other words, the ultrasound image) of the reception beam data RB. Hereinafter, the decision method of the evaluation range based on the change tendency of the frequency spectrum will be described in detail.

The evaluation range decision unit 20 can decide the evaluation range based on a change tendency of a frequency integrated value of the signal intensity in the frequency spectrum between the respective regions RE arranged in the depth direction. FIGS. 4A to 4E are diagrams showing a frequency integrated value I of the frequency spectrum for each of regions REa to REc shown in FIG. 2. The frequency integrated value I of each frequency spectrum is represented by an area of a shaded region in FIGS. 4A to 4E. It should be noted that, as shown in FIG. 2 or 3, the depth is increased from the region REa toward the region REe. Further, in FIG. 2 or 3, the regions REa, REb, REc, and REe are regions RE that do not include the structure of the subject and should be included in the evaluation range, and the region REd is the region RE that includes the structure (here, blood vessel) of the subject and should be excluded from the evaluation range.

Since the ultrasound waves are attenuated in the subject, as shown in FIGS. 4A to 4C and 4E, as the depth is increased, the signal intensity of the reception beam data RB is gradually decreased, and the frequency integrated value I of the frequency spectrum also tends to be gradually decreased. However, in the region RE including the structure as in the region REd, the signal intensity of the reception beam data RB is extremely increased as compared with the region REc or the region REe due to the influence of the reflected waves or the like from a wall part of the structure, and the frequency integrated value I of the frequency spectrum is also extremely increased. On the contrary, in a case in which the region RE is included in the blood vessel, the signal intensity of the reception beam data RB is extremely decreased as compared with the region REc or the region REe, and the frequency integrated value I of the frequency spectrum is also extremely decreased. In any case, the frequency integrated value I of the frequency spectrum of the region RE including the structure considerably deviates from a decrease tendency of the frequency integrated value I of the frequency spectrum in the depth direction region row RR including the region RE. As a result, the evaluation range decision unit 20 can specify the region RE including the structure.

In addition, the evaluation range decision unit 20 can decide the evaluation range based on a change tendency of the signal intensity slope representing a degree of decrease of the signal intensity toward the high frequency side in the frequency spectrum between the respective regions RE arranged in the depth direction. FIGS. 5A to 5E are diagrams showing a signal intensity slope G of the frequency spectrum for each of the regions REa to REe shown in FIG. 2. The signal intensity slope G of each frequency spectrum is represented by a one-point chain line in FIGS. 5A to 5E.

The ultrasound waves are attenuated in the subject, but the high frequency component is particularly attenuated. Therefore, as shown in FIGS. 5A to 5C and 5E, as the depth is increased, the high frequency component of the reception beam data RB is gradually removed, and as a result, an absolute value of the signal intensity slope G tends to be gradually increased. However, in this case as well, in the region REd including the structure, the absolute value of the signal intensity slope G is extremely increased or decreased as compared with the region REc or the region REe due to the influence of the reflected waves or the like from the wall part of the structure. As described above, the absolute value of the signal intensity slope G of the frequency spectrum of the region RE including the structure considerably deviates from an increase tendency of the absolute value of the signal intensity slope G of the frequency spectrum in the depth direction region row RR including the region RE. As a result, the evaluation range decision unit 20 can specify the region RE including the structure.

In addition, the evaluation range decision unit 20 can decide the evaluation range based on a change tendency of the cross point frequency that is a frequency at which the signal intensity of the signal component and the signal intensity of the noise component in the frequency spectrum are the same as each other between the respective regions RE arranged in the depth direction. FIGS. 6A to 6E are diagrams showing a signal component S, a noise component N, and a cross point CP of the frequency spectrum for each of the regions REa to REc shown in FIG. 2.

As the ultrasound waves are attenuated in the subject, the high frequency component of the signal component S is particularly attenuated. On the other hand, a distribution of the frequency components of the noise component N (particularly, the electrical noise generated in the ultrasound probe 12 or the apparatus main body of the ultrasound diagnostic apparatus 10) is not changed so much depending on the depth. Therefore, as shown in FIGS. 6A to 6C and 6E, as the depth is increased, the high frequency component of the signal component S is gradually removed, and as a result, the cross point CP is gradually moved to the low frequency side. However, as described above, in the region REd including the structure, since the signal intensity of the signal component S is extremely increased or decreased as compared with the region REc or the region REe, the frequency of the cross point CP is also extremely increased or decreased as compared with the region REc or the region REe. As described above, the cross point frequency of the frequency spectrum of the region RE including the structure considerably deviates from a decrease tendency of the cross point frequency of the frequency spectrum in the depth direction region row RR including the region RE. As a result, the evaluation range decision unit 20 can specify the region RE including the structure.

It should be noted that the noise component N in each region RE can be the signal intensity of each region RE of the reception beam data RB output from the transmission/reception unit 14 in an environment in which each oscillation element of the ultrasound probe 12 does not receive the reflected waves from the subject (for example, in a case in which the ultrasound waves are transmitted toward air). Therefore, the noise component N of each region RE is acquired in advance, and stored in the memory 32. It is possible to acquire the signal component S by subtracting the noise component N from the signal intensity of the reception beam data RB.

In addition, the evaluation range decision unit 20 can decide the evaluation range based on a change tendency of a representative frequency of the frequency spectrum between the respective regions RE arranged in the depth direction. FIGS. 7A to 7E are diagrams showing an average frequency AV as a representative frequency of the frequency spectrum for each of the regions REa to REe shown in FIG. 2. The average frequency AV of each frequency spectrum is represented by a one-point chain line in FIGS. 7A to 7E.

The ultrasound waves are attenuated in the subject, but the high frequency component is particularly attenuated. Therefore, as shown in FIGS. 7A to 7C and 7E, as the depth is increased, the frequency spectrum is moved toward the low frequency side as a whole, and as a result, the average frequency AV tends to be gradually decreased. However, as described above, in the region REd including the structure, the signal intensity of the reception beam data RB is extremely increased or decreased as compared with the region REc or the region REe. Therefore, the average frequency AV of the frequency spectrum of the region RE including the structure considerably deviates from a decrease tendency of the average frequency AV of the frequency spectrum in the depth direction region row RR including the region RE. As a result, the evaluation range decision unit 20 can specify the region RE including the structure.

It should be noted that, in the present embodiment, the representative frequency of the frequency spectrum is the average frequency AV, but the representative frequency is not limited to the average frequency AV, and may be, for example, a median frequency.

The evaluation range decision unit 20 decides the evaluation range based on any one of the methods described above. Alternatively, the evaluation range decision unit 20 may decide the evaluation range by combining the plurality of methods described above.

Whether or not a feature amount (frequency integrated value I, absolute value of signal intensity slope G, cross point frequency, or average frequency AV) of the frequency spectrum of a certain region RE deviates from a change tendency of the feature amount of the frequency spectrum in the depth direction region row RR including the region RE can be determined by various methods. For example, the evaluation range decision unit 20 calculates a difference in the feature amount between the respective regions RE adjacent to each other in the depth direction included in the depth direction region row RR, and calculates a representative value (average value, median value, or the like) of the plurality of differences. Then, in a case in which a deviation, which is a difference between the difference for a certain region RE and the representative value, is equal to or larger than a deviation threshold value, it can be determined that the region RE is the region RE outside the evaluation range. On the other hand, in a case in which the deviation between the difference for a certain region RE and the representative value is less than the deviation threshold value, it can be determined that the region RE is the region RE within the evaluation range.

In addition, the attenuation amount estimation unit 22 can also exclude a feature amount having an apparently strange value as the feature amount (for example, an extremely large feature amount). A reference range (for example, a minimum value threshold value and a maximum value threshold value) of the feature amount can be determined in advance for each feature amount, and in a case in which the feature amount for a certain region RE is not included the reference range, the region RE can be excluded from the evaluation range.

Estimation of Attenuation Amount

The attenuation amount estimation unit 22 calculates the frequency spectrum of the reception beam data RB for each region RE. Then, the attenuation amount estimation unit 22 estimates, for each depth direction region row RR, the attenuation amount of the ultrasound waves based on the frequency spectrum of the reception beam data RB of each region RE included in the evaluation range among the plurality of regions RE included in the depth direction region row RR without using the frequency spectrum of the reception beam data RB of the region RE that is not included in the evaluation range decided by the evaluation range decision unit 20. Hereinafter, details of the decision method of the evaluation range based on the frequency spectrum of the reception beam data RB of the region RE included in the evaluation range will be described.

The attenuation amount estimation unit 22 can estimate the attenuation amount of the ultrasound waves based on the frequency integrated value I (see FIGS. 4A to 4C and 4E) of the signal intensity in the frequency spectrum of the region RE that is each region RE arranged in the depth direction and included in the evaluation range. As described above, as the ultrasound waves are attenuated in the depth direction, the frequency integrated value I in the frequency spectrum of the reception beam data RB of each region RE arranged in the depth direction and included in the evaluation range is gradually decreased. In other words, since it can be said that the frequency integrated value I is an indicator of the attenuation of the ultrasound waves, the attenuation amount of the ultrasound waves can be estimated based thereon.

In addition, the attenuation amount estimation unit 22 can estimate the attenuation amount of the ultrasound waves based on the signal intensity slope G (see FIGS. 5A to 5C and 5E) in the frequency spectrum of the region RE that is each region RE arranged in the depth direction and included in the evaluation range. As described above, as the ultrasound waves are attenuated in the depth direction, the absolute value of the signal intensity slope G in the frequency spectrum of the reception beam data RB of each region RE arranged in the depth direction and included in the evaluation range is gradually increased. In other words, since it can be said that the absolute value of the signal intensity slope G is an indicator of the attenuation of the ultrasound waves, the attenuation amount of the ultrasound waves can be estimated based thereon.

In addition, the attenuation amount estimation unit 22 can estimate the attenuation amount of the ultrasound waves based on the cross point frequency (see FIGS. 6A to 6C and 6E) in the frequency spectrum of the region RE that is each region RE arranged in the depth direction and included in the evaluation range. As described above, as the ultrasound waves are attenuated in the depth direction, the cross point frequency in the frequency spectrum of the reception beam data RB of each region RE arranged in the depth direction and included in the evaluation range is gradually decreased. In other words, since it can be said that the cross point frequency is an indicator of the attenuation of the ultrasound waves, the attenuation amount of the ultrasound waves can be estimated based thereon.

In addition, the attenuation amount estimation unit 22 can estimate the attenuation amount of the ultrasound waves based on the representative frequency (see FIGS. 7A to 7C and 7E) in the frequency spectrum of the region RE that is each region RE arranged in the depth direction and included in the evaluation range. Even in this case, in the present embodiment, the representative value of the frequency spectrum is the average frequency AV, but the representative value may be a median frequency or the like. As described above, as the ultrasound waves are attenuated in the depth direction, the average frequency AV in the frequency spectrum of the reception beam data RB of each region RE arranged in the depth direction and included in the evaluation range is gradually decreased. In other words, since it can be said that the average frequency AV is an indicator of the attenuation of the ultrasound waves, the attenuation amount of the ultrasound waves can be estimated based thereon.

The attenuation amount estimation unit 22 estimates the attenuation amount of the ultrasound waves based on any one of the methods described above. Alternatively, the attenuation amount estimation unit 22 may estimate the attenuation amount of the ultrasound waves by combining the plurality of methods described above.

Figure 8:
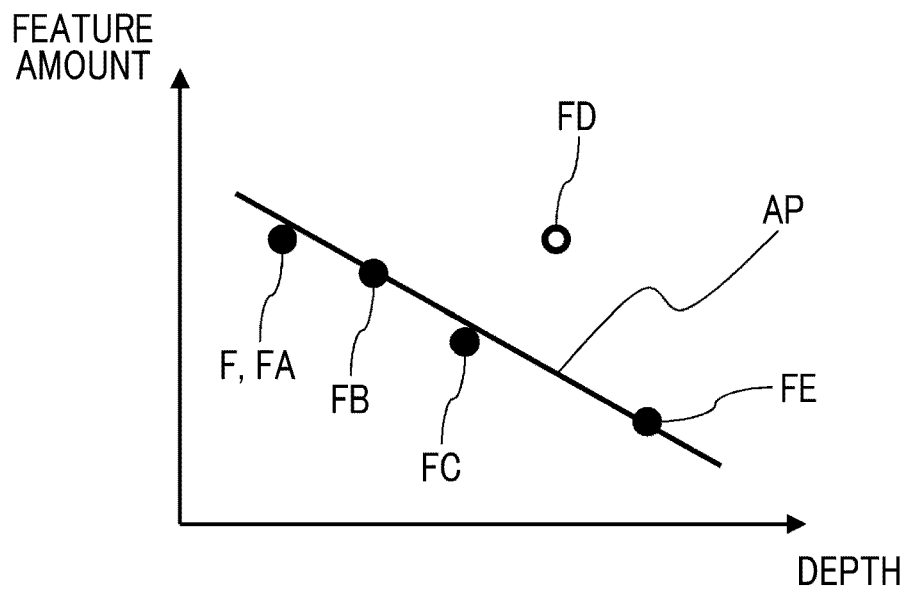
FIG. 8 is a first graph showing a relationship between a depth and a feature amount in a region row arranged in a depth direction.

Specifically, as shown in FIG. 8, the attenuation amount estimation unit 22 plots a feature amount F (feature amounts FA to FE in FIG. 8) of each region RE included in one depth direction region row RR in a two-dimensional data space of the depth and the feature amount (frequency integrated value I, absolute value of signal intensity slope G, cross point frequency, or average frequency AV).

Here, the feature amount F (feature amount FD in FIG. 8) of the region RE that is not included in the evaluation range is excluded. Then, the attenuation amount estimation unit 22 calculates a function (including a quadratic function, a cubic function, or a function of a higher order) that approximates the remaining feature amounts FA, FB, FC, and FE, and sets a coefficient of the calculated function as the attenuation amount of the ultrasound waves. In the present embodiment, for the sake of simplicity, the attenuation amount estimation unit 22 generates an approximate straight line AP of the feature amounts FA, FB, FC, and FE, and sets an absolute value of a slope of the approximate straight line AP as the attenuation amount of the ultrasound waves. In a case in which the attenuation amount is estimated by combining the frequency integrated value I, the absolute value of the signal intensity slope G, the cross point frequency, or the average frequency AV, for example, an average value of the absolute values of the slopes of the plurality of approximate straight lines AP or the like can be set as the attenuation amount of the ultrasound waves based on a plurality of approximate straight lines AP calculated for each feature amount.

The attenuation amount estimation unit 22 calculates the attenuation amount (slope of the approximate straight line AP) of the ultrasound waves for each depth direction region row RR. In some cases, the attenuation amounts of the ultrasound waves are different for each depth direction region row RR, and in a case in which the TGC is performed based on the attenuation amount as it is, the brightness correction values may be different for each depth direction region row RR. Therefore, the attenuation amount estimation unit 22 may estimate the frame attenuation amount corresponding to one frame based on the plurality of attenuation amounts estimated for the plurality of depth direction region rows RR for one frame. The frame attenuation amount can be a representative value (for example, an average value) of the plurality of attenuation amounts estimated for the plurality of depth direction region rows RR for one frame.

Figure 9:
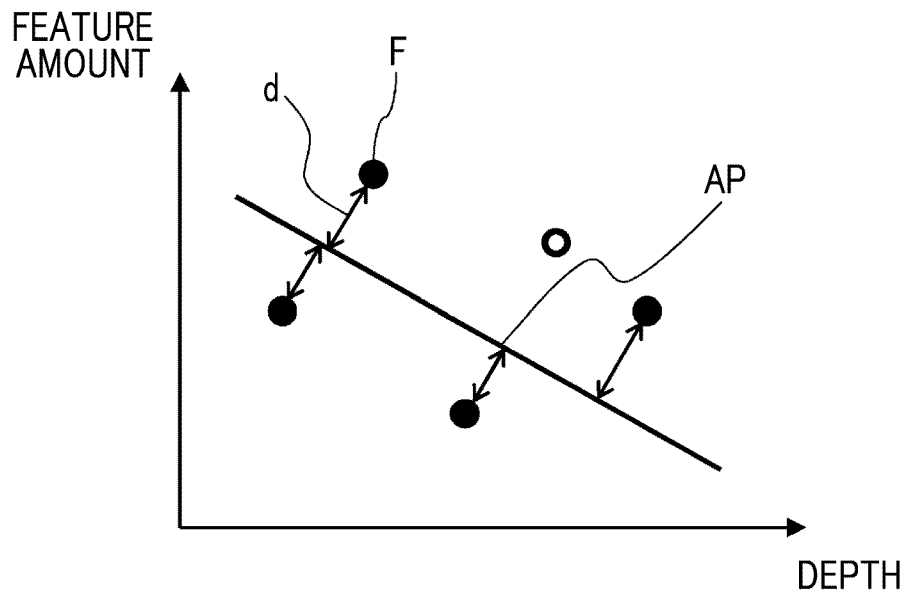
FIG. 9 is a second graph showing the relationship between the depth and the feature amount in the region row arranged in the depth direction.

As shown in FIG. 9, a case is also considered in which the feature amount F of each region RE included in one depth direction region row RR and determined to be within the evaluation range does not show the decrease tendency (or increase tendency) and varies. Even in such a case, the approximate straight line AP can be generated, but there is no guarantee that the approximate straight line AP correctly represents the attenuation amount of the ultrasound waves. Therefore, in a case in which a plurality of feature amounts F calculated for the depth direction region row RR satisfy a predetermined exclusion criterion, the attenuation amount estimation unit 22 may estimate the frame attenuation amount by excluding the depth direction region row RR.

For example, the attenuation amount estimation unit 22 calculates a distance d between the generated approximate straight line AP and the feature amount F of each region RE within the evaluation range, and totals a plurality of distances d for each region RE. In a case in which the total value of the distances d is equal to or larger than a predetermined distance threshold value, the attenuation amount for the depth direction region row RR is not used for estimating the frame attenuation amount.

TGC Processing

The image formation unit 24 executes the TGC processing based on the frame attenuation amount estimated by the attenuation amount estimation unit 22. In other words, the image formation unit 24 performs processing of transforming the brightness of each pixel of the ultrasound image according to the depth to compensate for the attenuation of the ultrasound waves indicated by the frame attenuation amount.

Figure 10:
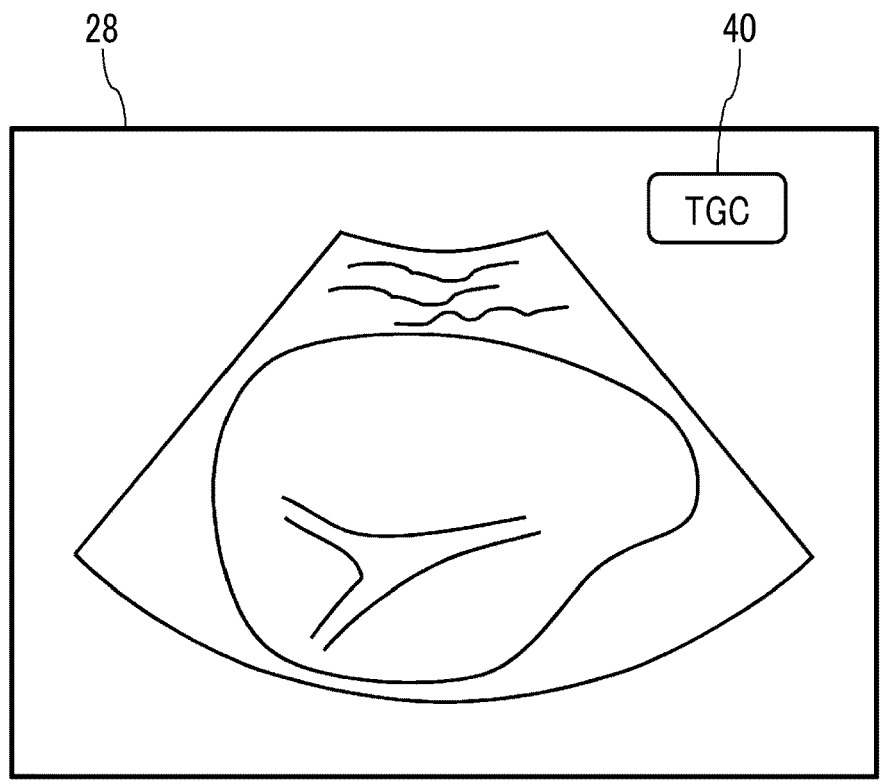
FIG. 10 is a diagram showing a display example of a TGC button.

The image formation unit 24 may execute the TGC processing at a timing at which the user of the ultrasound diagnostic apparatus 10 gives an instruction. For example, as shown in FIG. 10, the display controller 26 may display a TGC button 40 on the display 28, and the image formation unit 24 may execute the TGC processing with the operation of the TGC button 40 by the user as a trigger. A button for inputting the instruction for the TGC processing from the user may be provided in the input interface 30. In a case in which the TGC processing is always executed, the brightness of the B-mode image displayed on the display 28 may be changed (flicker) from moment to moment, which may make it difficult to see. By the image formation unit 24 executing the TGC processing in response to the instruction from the user, the user can execute the TGC processing at any timing, and can suppress flicker of the B-mode image.

In addition, in a case in which the ultrasound probe 12 is provided with the acceleration sensor, the image formation unit 24 can detect a change in the posture of the ultrasound probe 12 based on the signal from the acceleration sensor. In this case, the image formation unit 24 may execute the TGC processing in a case in which it is determined that the posture of the ultrasound probe 12 is stable. As a result, the TGC processing can be automatically executed in a case in which the user brings the ultrasound probe 12 into contact with the target position of the subject and maintains the contact.

Effects of Ultrasound Diagnostic Apparatus According to Present Embodiment

The outline of the ultrasound diagnostic apparatus 10 according to the present embodiment is described above. In the present embodiment, the evaluation range decision unit 20 excludes the region RE including the structure in the subject from the evaluation range that is the target for estimating the attenuation amount of the ultrasound waves. As a result, in the TGC PROCESSING, the influence of the structure in the subject can be reduced. Further, in the present embodiment, the attenuation amount estimation unit 22 calculates the frequency spectrum of the reception beam data RB for each region RE having a certain width, and estimates the attenuation amount of the ultrasound image based on the frequency spectra of the plurality of regions RE arranged in the depth direction. As a result, in the TGC processing, the influence of the speckle can be reduced.

Flow of Processing of Ultrasound Diagnostic Apparatus

Figure 11:
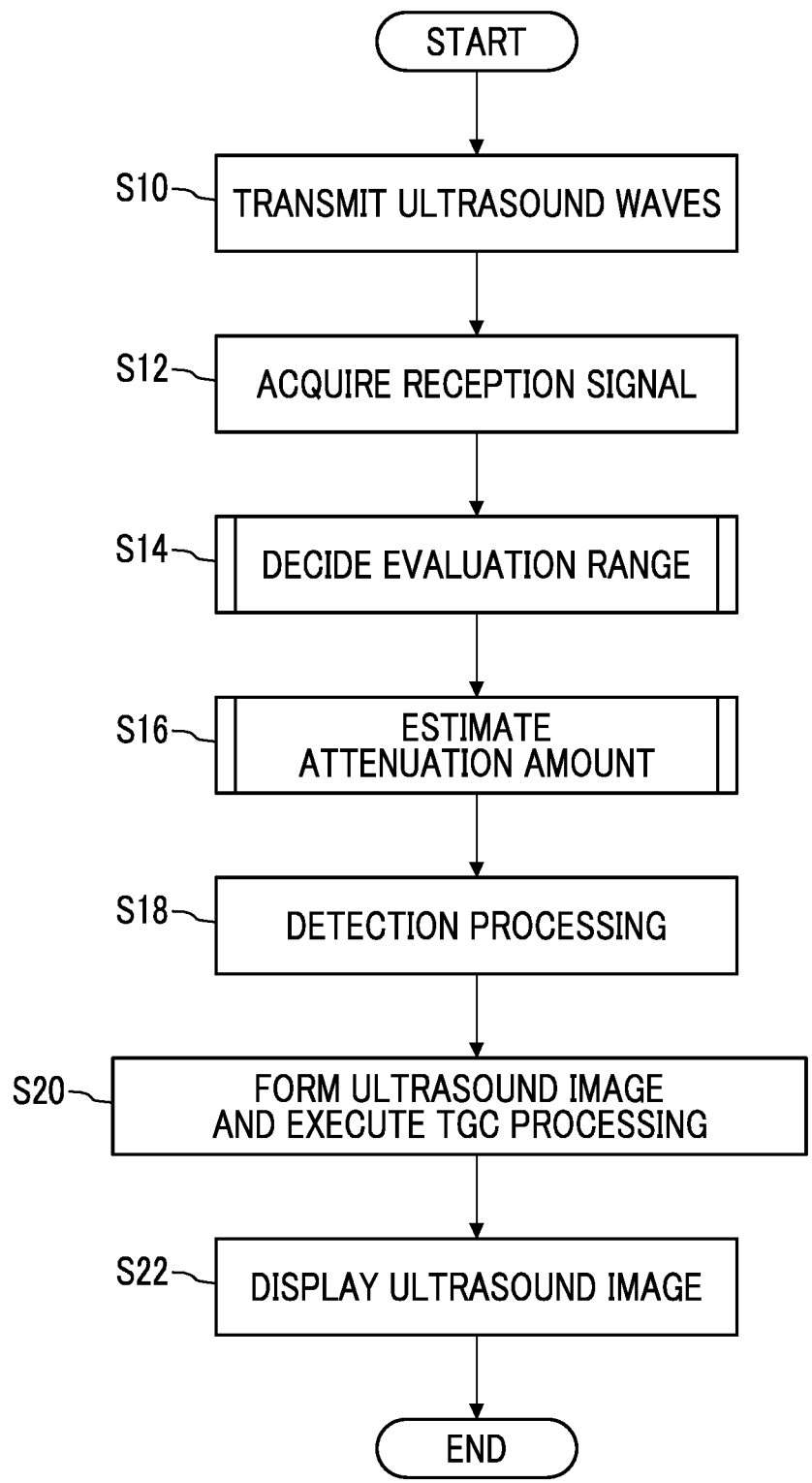
FIG. 11 is a flowchart showing a flow of processing of the ultrasound diagnostic apparatus according to the present embodiment.

Hereinafter, a flow of the processing of the ultrasound diagnostic apparatus 10 will be described with reference to the flowchart shown in FIGS. 11 to 13. FIG. 11 is a flowchart showing a flow of entire processing of the ultrasound diagnostic apparatus 10.

In step S10, the transmission/reception unit 14 supplies the transmission signal to the ultrasound probe 12. As a result, the ultrasound waves are transmitted from the plurality of oscillation elements of the ultrasound probe 12 to the subject.

In step S12, the plurality of oscillation elements of the ultrasound probe 12 receive the reflected waves from the subject and transmit the reception signal to the transmission/reception unit 14. As a result, the transmission/reception unit 14 acquires the reception signal. The transmission/reception unit 14 performs the reception beam forming with respect to the reception signal to generate the reception beam data RB. The reception beam data RB before the detection processing (reception beam data RB immediately after the reception beam forming by the transmission/reception unit 14 or reception beam data RB after the filter processing by the signal processing unit 16) is transmitted to the evaluation range decision unit 20.

In step S14, the evaluation range decision unit 20 decides the evaluation range. A flow of decision processing of the evaluation range will be described later with reference to FIG. 12.

In step S16, the attenuation amount estimation unit 22 estimates the attenuation amount of the ultrasound waves. A flow of estimation processing of the attenuation amount of the ultrasound waves will be described later with reference to FIG. 13.

In step S18, the detection processing unit 18 executes the detection processing with respect to the reception beam data RB from the signal processing unit 16. It should be noted that the processing of steps S14 and S16 and step S18 can be executed in parallel.

In step S20, the image formation unit 24 forms the ultrasound image (B-mode image) based on the reception beam data RB after the detection processing. In addition, the image formation unit 24 executes the TGC processing in the formation processing of the ultrasound image or with respect to the formed ultrasound image, based on the attenuation amount of the ultrasound waves estimated in step S16.

In step S22, the display controller 26 displays the ultrasound image formed in step S20, on the display 28.

Figure 12:
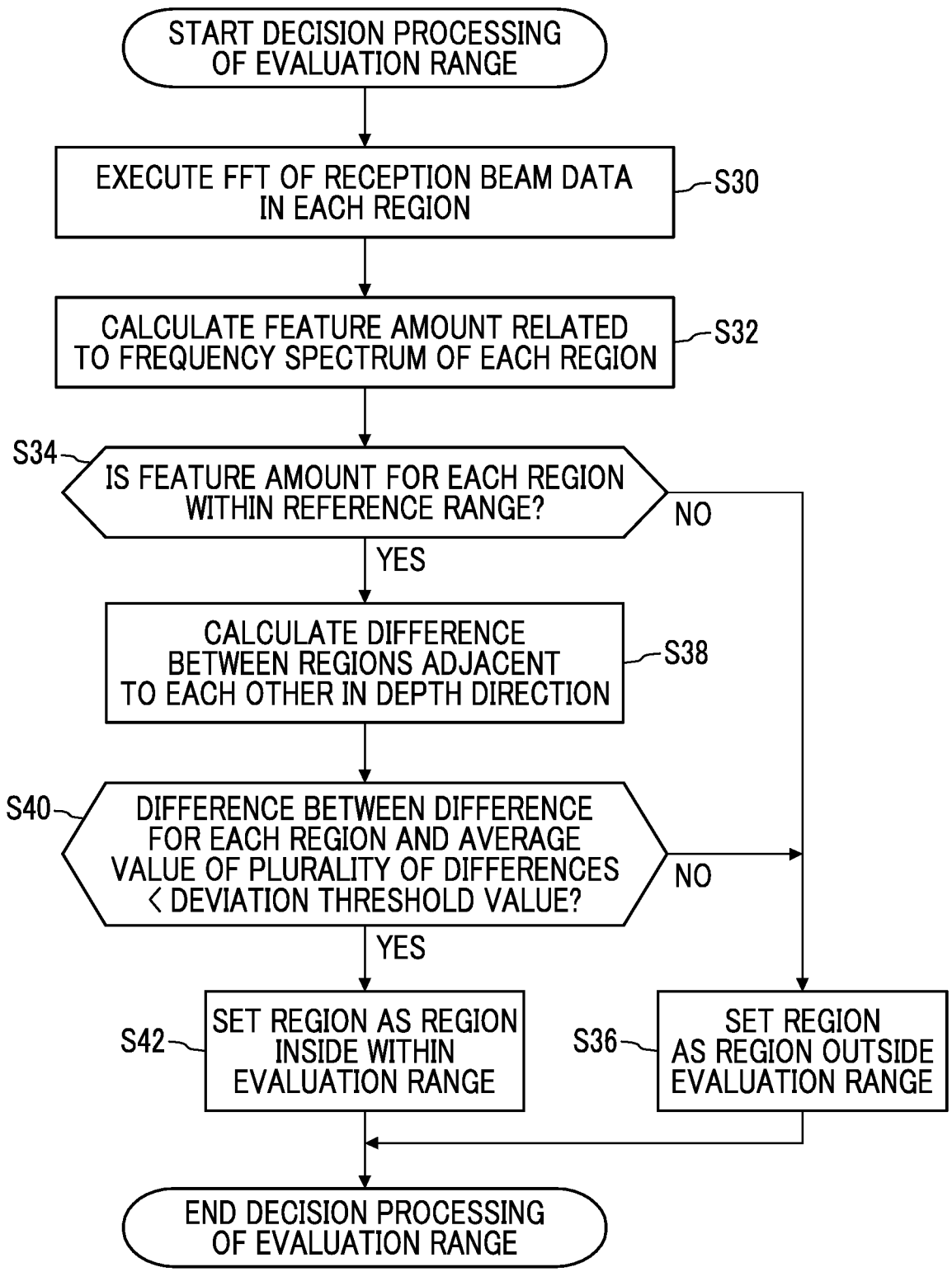
FIG. 12 is a flowchart showing a flow of decision processing of an evaluation range.

FIG. 12 is a flowchart showing a flow of the decision processing of the evaluation range.

In step S30, the evaluation range decision unit 20 executes the FFT with respect to the reception beam data RB in each region RE defined in advance in the data space of the reception beam data RB. As a result, the frequency spectrum of the reception beam data RB is acquired for each region RE.

In step S32, the evaluation range decision unit 20 calculates the feature amount of the frequency spectrum of each region RE. The feature amount is, for example, the frequency integrated value I, the absolute value of the signal intensity slope G, the cross point frequency, or the average frequency AV described above. The evaluation range decision unit 20 may hold the calculated feature amount of each region RE in the memory 32.

In step S34, the evaluation range decision unit 20 determines whether or not the feature amount of each region RE is within the predetermined reference range. In a case in which the feature amount is outside the reference range, the processing proceeds to step S36, and the evaluation range decision unit 20 sets the region RE as the region RE outside the evaluation range. For the region RE in which the feature amount is within the reference range, the processing proceeds to step S38 and subsequent steps.

In step S38, the evaluation range decision unit 20 calculates the difference in the feature amount between the respective regions RE adjacent to each other in the depth direction included in the depth direction region row RR. Then, the evaluation range decision unit 20 calculates the representative value (here, the average value) of the plurality of calculated differences.

In step S40, the evaluation range decision unit 20 determines, for each region RE included in the depth direction region row RR, whether or not the deviation, which is the difference between the difference for the region RE and the average value of the plurality of differences calculated in step S38, is less than the predetermined deviation threshold value. In a case in which the deviation is equal to or larger than the deviation threshold value, the processing proceeds to step S36, and the evaluation range decision unit 20 sets the region RE as the region RE outside the evaluation range. For the region RE in which the deviation is less than the deviation threshold value, in step S42, the evaluation range decision unit 20 sets the region RE as the region RE within the evaluation range.

FIG. 13 is a flowchart showing a flow of the estimation processing of the attenuation amount.

In step S50, the attenuation amount estimation unit 22 selects a region of interest among the plurality of regions RE defined in advance.

In step S52, the attenuation amount estimation unit 22 determines whether or not the region of interest selected in step S50 is within the evaluation range. In a case in which the selected region of interest is outside the evaluation range, the processing returns to step S50, and the attenuation amount estimation unit 22 selects another region RE as the region of interest. In a case in which the selected region of interest is within the evaluation range, the processing proceeds to step S54.

In step S54, the attenuation amount estimation unit 22 acquires the feature amount (frequency integrated value I, absolute value of signal intensity slope G, cross point frequency, average frequency AV, or the like described above) for the region of interest. Here, the attenuation amount estimation unit 22 may perform the FFT with respect to the reception beam data RB in the region of interest again, or may use the feature amount calculated in step S32 and held in the memory 32.

In step S56, the attenuation amount estimation unit 22 determines whether or not the processing of steps S50 to S54 is performed for all the regions RE. In a case in which the region RE for which the processing is not executed remains, the processing returns to step S50. In a case in which the processing for all the regions RE is completed, the processing proceeds to step S58. By the processing of steps S50 to S56, the feature amount for the region RE within the evaluation range is acquired.

In step S58, the attenuation amount estimation unit 22 selects a depth direction region row of interest among the plurality of depth direction region rows RR.

In step S60, the attenuation amount estimation unit 22 plots the feature amount for each region RE included in the selected depth direction region row of interest and included in the evaluation range in the two-dimensional data space of the depth and the feature amount (see FIG. 8). Then, the approximate straight line AP of each of the plotted feature amounts is generated.

In step S62, the attenuation amount estimation unit 22 determines whether or not the feature amount for each region RE included in the selected depth direction region row of interest and included in the evaluation range satisfies the predetermined exclusion criterion. In a case in which the exclusion criterion is satisfied, the attenuation amount estimation unit 22 does not use the depth direction region row of interest for estimating the frame attenuation amount, returns to step S58, and selects another depth direction region row of interest. In a case in which the exclusion criterion is not satisfied, the absolute value of the slope of the approximate straight line AP generated in step S60 is estimated as the attenuation amount of the ultrasound waves in the depth direction region row of interest. Then, the processing proceeds to step S64.

It is determined in step S64 whether or not the processing of steps S58 to S62 is performed for all the depth direction region rows RR for one frame. In a case in which the depth direction region row RR for which the processing is not executed remains, the processing returns to step S58. In a case in which the processing for all the depth direction region rows RR is completed, the processing proceeds to step S66. By the processing of steps S58 to S62, the attenuation amount of the ultrasound waves for all the depth direction region rows RR is acquired.

In step S66, the attenuation amount estimation unit 22 estimates the frame attenuation amount corresponding to one frame based on the plurality of attenuation amounts estimated for the plurality of depth direction region rows RR for one frame. For example, the attenuation amount estimation unit 22 sets the average value of the plurality of attenuation amounts estimated for the plurality of depth direction region rows RR for one frame as the frame attenuation amount.

Although the embodiment according to the present invention has been described above, the present invention is not limited to the embodiment described above, and various modifications can be made without departing from the gist of the present invention.

For example, in the present embodiment, the ultrasound probe 12 is the probe including the oscillation elements arranged in a row, but the ultrasound probe 12 may be a two-dimension (2D) array probe including oscillation elements arranged in two dimensions. The reception beam data, which is the processing target of each of the units of the ultrasound diagnostic apparatus 10, may constitute three-dimensional volume data obtained by the 2D array probe and extending in the depth direction, an azimuth direction, and a slice direction.

What is claimed is:
1. An ultrasound diagnostic apparatus, comprising:
a processor configured to:
define a plurality of regions in advance before receiving reception beam data, each of the plurality of regions corresponds to a different location of an ultrasound image;
analyze reception beam data before detection processing out of reception beam data formed by reception beam forming with respect to a reception signal obtained by transmitting and receiving ultrasound waves to and from a subject;
decide an evaluation range which comprises the plurality of regions except for an excluded region of the plurality of regions, wherein the excluded region corresponds to a part of a structure of the subject in a data space of the reception beam data;
estimate an attenuation amount of the ultrasound waves based on a frequency spectrum of the reception beam data before the detection processing of each region included in the evaluation range among the plurality of regions arranged in a depth direction of the subject defined in advance in the data space of the reception beam data, by excluding a regional reception beam data of the excluded region that is not included in the evaluation range; and
form the ultrasound image based on the reception beam data subjected to the detection processing while executing brightness correction processing of correcting, to compensate for brightness of pixels of the ultrasound image which is decreased due to attenuation amount of the ultrasound waves, the brightness of each pixel of the pixels of the ultrasound image based on the attenuation amount.

2. The ultrasound diagnostic apparatus according to claim 1,
wherein the processor is further configured to decide the evaluation range based on a change tendency of the frequency spectrum of the reception beam data before the detection processing between the plurality of regions arranged in the depth direction.

3. The ultrasound diagnostic apparatus according to claim 2,
wherein the processor is further configured to decide the evaluation range based on at least one of a change tendency of a frequency integrated value of signal intensity in the frequency spectrum, a change tendency of a signal intensity slope representing a degree of decrease of the signal intensity toward a high frequency side in the frequency spectrum, a change tendency of a cross point frequency that is a frequency at which signal intensity of a signal component and signal intensity of a noise component in the frequency spectrum are the same as each other, or a change tendency of a representative frequency of the frequency spectrum between the plurality of regions arranged in the depth direction.

4. The ultrasound diagnostic apparatus according to claim 1,
wherein the processor is further configured to estimate the attenuation amount based on at least one of a frequency integrated value of signal intensity in the frequency spectrum, a signal intensity slope representing a degree of decrease of the signal intensity toward a high frequency side in the frequency spectrum, a cross point frequency that is a frequency at which signal intensity of a signal component and signal intensity of a noise component in the frequency spectrum are the same as each other, or a representative frequency of the signal component in the frequency spectrum of the plurality of regions arranged in the depth direction.

5. The ultrasound diagnostic apparatus according to claim 1,
wherein the processor is further configured to estimate the attenuation amount for each region row arranged in the depth direction, to estimate a frame attenuation amount corresponding to one frame based on a plurality of the attenuation amounts estimated for a plurality of the region rows for one frame.

6. The ultrasound diagnostic apparatus according to claim 1,
wherein the processor is further configured to execute the brightness correction processing at a timing at which an instruction is given from a user.

7. The ultrasound diagnostic apparatus according to claim 1,
wherein the processor is further configured to execute the brightness correction processing in a case in which it is determined that a posture of an ultrasound probe that transmits and receives the ultrasound waves to and from the subject is stable.

* * * * *